United States Patent
Read (10) Patent No.: US 6,577,639 B1
(45) Date of Patent: Jun. 10, 2003

(54) REDUCING MODEM TRANSMIT LATENCY

(75) Inventor: Brooks S. Read, Concord, MA (US)

(73) Assignee: ATI International SRL, Hastings (BB)

( * ) Notice: Subject to any disclaimer, the term of this patent is extended or adjusted under 35 U.S.C. 154(b) by 0 days.

(21) Appl. No.: 09/323,983

(22) Filed: Jun. 1, 1999

(51) Int. Cl.$^7$ .................................................. H04J 3/07
(52) U.S. Cl. ...................................... 370/412; 370/429
(58) Field of Search .............................. 370/429, 412, 370/493, 494, 495, 428, 9; 714/748, 749; 710/39, 40

(56) References Cited

U.S. PATENT DOCUMENTS

| | | | |
|---|---|---|---|
| 4,385,384 A | 5/1983 | Rosbury et al. | 371/22 |
| 5,001,480 A | 3/1991 | Ferry et al. | 341/108 |
| 5,377,257 A | 12/1994 | Shirasaka et al. | 379/67 |
| 5,414,767 A | 5/1995 | Kerguiduff | 379/410 |
| 5,535,014 A | 7/1996 | Sommer | 358/434 |
| 5,721,830 A | 2/1998 | Yeh | 395/200.67 |
| 5,844,970 A | 12/1998 | Hsu | 379/93.24 |
| 6,233,250 B1 * | 5/2001 | Liu et al. | 370/469 |
| 6,400,724 B1 * | 6/2002 | Yao | 370/429 |

FOREIGN PATENT DOCUMENTS

EP  0 896 443 A2  10/1998  ........... G06F/17/30

OTHER PUBLICATIONS

North, et al., The performance of adaptive equalization for digital communication systems corrupted by interference, Conference Record of The Twenty–Seventh Asilomar Conference [unknown] on, 1993.

U.S. patent application Ser. No. 09/102,028, Read, filed on Jun. 22, 1998.

* cited by examiner

Primary Examiner—Ken Vanderpuye
(74) Attorney, Agent, or Firm—David E. Boundy; Schulte Roth & Zabel LLP (57) ABSTRACT

A method for assuring that samples are always available for transmission when a modem is implemented as a process executing in the memory of a host computer. The modem process converts, digital information into transmit data samples. In the absence of digital information, the modem process converts fill data into fill data samples. The transmit data samples and fill data samples are stored in a segmented buffer for transmission to a remote modem. If additional transmit data samples become available and the buffer contains fill data samples which have not been transmitted to the remote modem, the modem process replaces the fill data samples in the buffer with the additional transmit data samples. The method helps assure that samples are always available for transmission, and simultaneously reduces the time delay or latency between when data enter the modem and when the data are subsequently transmitted.

41 Claims, 6 Drawing Sheets

FIG. 1

```
do while (the modem is active)
{
        /*** determine whether fill data samples in the previous block of transmit sample
             buffer can be replaced with transmit data samples ***/ if (the CODEC has not started to read samples from the current block)
        {
                /*** determine whether the two predicates are satisfied***/
                if (the previous block of transmit sample buffer contains at least one fill data sample) and
                   (transmit data are available to convert to samples)

then
                        {
                                /*** prepare to rewrite the current block of the transmit sample buffer ***/
                                restore the transmitter state from the state save buffer
                                restore the consumer pointer to the address of the datum corresponding to the
                                        beginning of the current block of the transmit sample buffer
                                restore the supplier pointer to the address location of the beginning of the
                                        current block of the transmit sample buffer /* rewrite the current block */
                                do while (there is transmit data in the transmit data buffer and
                                        there is room in the current block of the transmit sample buffer)
                                {
                                        convert transmit data from the transmit data buffer into a sample
                                        store the newly converted sample in the next position of the current block
                                                of the transmit sample buffer
                                } fill out the current block of the transmit sample buffer with fill data samples
                                update the supplier pointer to the address of the beginning of the next block
                        }
        } save the transmitter state in the state save buffer

/* convey samples to the next block */
        do while (there is transmit data in the transmit data buffer and
                there is room in the current block of the transmit sample buffer)
        {
                convert transmit data from the transmit data buffer into a sample
                store the newly converted sample in the next position of the current block
                        of the transmit sample buffer
        } fill out the current block of the transmit sample buffer with fill data samples
        update the supplier pointer to the address of the beginning of the next block
        surrender the CPU process
}
```

FIG. 2A

```
else
{
        /***  convey samples to the first block of transmit sample buffer***/
        do while (there is transmit data in the transmit data buffer and
                    there is room in the current block of the transmit sample buffer)
        {
                convert transmit data from the transmit data buffer into a sample
                store the newly converted sample in the next position of the first block
                        of the transmit sample buffer
        }
                fill out the first block of the transmit sample buffer with fill data samples
                update the supplier pointer to the address of the beginning of the next block save the transmitter state in the state save buffer /*  convey samples to the second block of the transmit sample buffer*/
        do while (there is transmit data in the transmit data buffer and
                    there is room in the current block of the transmit sample buffer)
        {
                convert transmit data from the transmit data buffer into a sample
                store the newly converted sample in the next position of the current block
        }       of the transmit sample buffer fill out the current block of the transmit sample buffer with fill data samples
        update the supplier pointer to the address of the beginning of the next block
        surrender the CPU process

REDUCING MODEM TRANSMIT LATENCY

BACKGROUND

The invention relates to modems.

A modem ("modulator-demodulator") is an electronic device that converts digital information to and from an analog form for communication over an analog communication channel such as a telephone or cable television line. In a typical modem, the conversion goes through an intermediate form, in which the analog form is represented in the form of digital samples. The digital samples are an alternative way to represent the digital information, similar to the way an acoustic waveform is digitally represented in the binary data stored on a music CD.

A modem typically was implemented as a separate piece of hardware communicatively coupled to a computer's host central processing unit (CPU). A modem may also be implemented as a process executing on the host CPU. The host CPU, however, may be a shared resource executing any number of processes, in which the host CPU dedicates separate periods of time (time slices) to each process. Consequently, competition for the host CPU can delay translation of digital transmit data into an analog waveform (i.e., a data starvation condition). A data starvation condition could also occur if the modem transmits information faster than the computer supplies transmit data. Modem implementation standards such as "V.90", "V.34", and "V.32", however, require that an operative modem continuously transmit an analog signal, even if transmit data are unavailable.

SUMMARY

The invention features techniques for reducing transmit latency in a computer modem without sacrificing reliability.

In general, in a first aspect, the invention features a method of conveying transmit data samples followed by fill data samples to a transmit buffer, the transmit data samples encoding transmit data generated for transmission to a receiver, the fill data samples having been generated to consume transmission time when transmit data are unavailable. The transmit buffer is segmented into a plurality of blocks for storing the transmit data samples and fill data samples, the number of blocks being smaller than the total sample capacity of the transmit buffer. The total number of samples conveyed to the transmit buffer is chosen to fill the transmit buffer to a boundary between the blocks. The contents of the transmit buffer are conveyed to the receiver. After filling a current block of the transmit buffer with transmit data samples and fill data samples, fill data samples in the current block are replaced with transmit data samples if additional transmit data samples become available prior to conveying the fill data samples to the receiver.

In general, in a second aspect, the invention features a method of conveying samples including transmit data samples and fill data samples to a transmit buffer, the transmit data samples encoding transmit data for transmission to a receiver, the fill data samples having been generated to consume transmission time when transmit data are unavailable. The transmit buffer is segmented into a plurality of blocks for storing the samples, the number of blocks being much smaller than the total sample capacity of the transmit buffer. The total number of samples conveyed to the transmit buffer is chosen to fill the transmit buffer to a boundary between the blocks. The method additionally includes the step of determining whether to reconvey samples to the current block after filling the current block, or whether to convey samples to exactly fill a next block.

In general, in a third aspect, the invention features a method of storing transmit data samples followed by fill data samples in a transmit buffer, the transmit data samples encoding transmit data generated for transmission to a receiver, the fill data samples being predetermined samples to send in the absence of transmit data samples. The contents of the transmit buffer are conveyed to the receiver. Fill data samples in the transmit buffer are replaced with transmit data samples if additional transmit data samples become available prior to conveying the fill data samples to the receiver.

Embodiments of the invention may include one or more of the following features. The transmit buffet may be segmented into multiple blocks for storing transmit data samples and fill data samples, so that a process conveying samples to the transmit buffer leaves the transmit buffer filled to a segment boundary. The multiple blocks may be of equal size. Fill data samples in the current block may be replaced prior to conveying transmit data samples or fill data samples to the next block. Determining whether to reconvey samples to the current block may be based in part on determining whether the current block contains fill data samples, whether additional transmit data are available, or whether samples from the current block have been transmitted to the receiver, or any combination of the three. The method may reconvey the entire block or only the portion of the current block containing fill data samples, replacing fill data samples with new transmit data samples to the extent that new transmit data are available and, if necessary, filling any remaining portion of the block with fill data samples. A block may be initialized with fill data samples, and the fill data samples overwritten with transmit data samples to the extent transmit data samples become available. The state of a converter that converts the transmit data to transmit data samples may be saved as the conveying crosses a block boundary in the transmit buffer, or as the first fill sample is conveyed to a block, and the saved state may be restored when reconveying samples. An analog waveform may be generated from samples in the transmit buffer for transmission to the receiver. The method may cancel echoes in received samples induced by transmitting the samples to the receiver. A program stored on a computer storage medium may be designed to perform the above method.

Particular embodiments of the invention may feature one or more of the following advantages. The numerically-intensive signal processing and logically intensive protocol management of a modem process can both be performed in the microprocessor of a computer system, reducing system cost. The sample buffer size may be increased to help assure that samples are always available for transmission, thereby complying with modem implementation standards. Simultaneously, the time delay or latency between when data enter the modem and when the data are subsequently transmitted can be reduced, by moving actual transmit data samples further forward in the sample buffer than would otherwise be possible.

The above advantages and features are of representative embodiments only, and are presented only to assist in understanding the invention. It should be understood that they are not to be considered limitations on the invention as defined by the claims, or equivalents to the claims. For instance, some pairs of these advantages are mutually contradictory, in that they cannot be simultaneously present in a single embodiment. Similarly, some advantages are applicable to one aspect of the invention, and inapplicable to others. Thus, no single advantage should be considered dispositive in determining equivalence. Additional features and advantages of the invention will become apparent in the following description, from the drawings, and from the claims.

DESCRIPTION OF THE DRAWINGS

FIGS. 2A and 2B are pseudo code describing the transmitter process; and

DESCRIPTION

I. Overview

Figure 1:
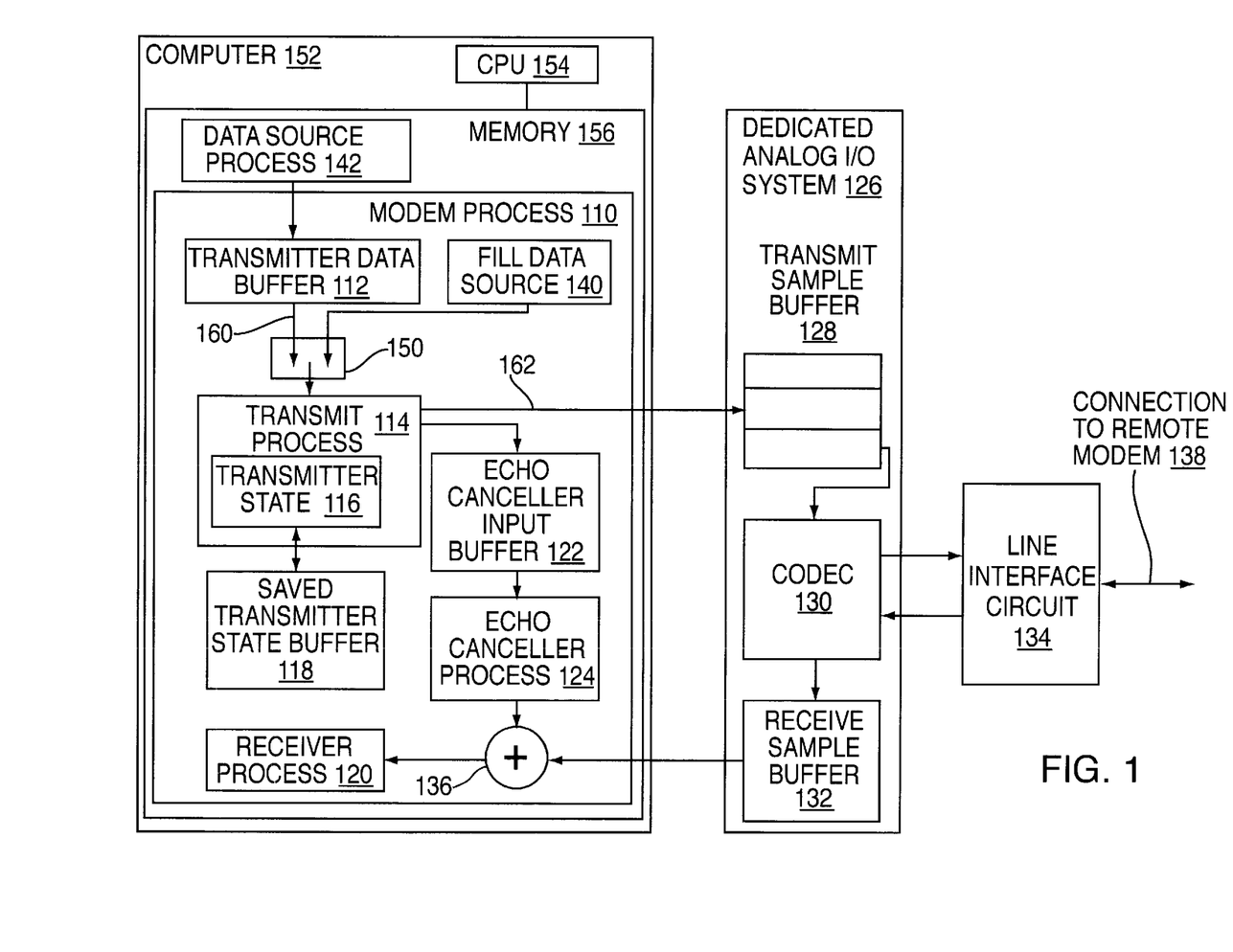
FIG. 1 is a block diagram of a modem implementation in a host computer.

Referring to FIG. 1, modem process 110 converts digital information (transmit data) generated by data source process 142 from transmit data buffer 112 into transmit data samples, and fill data from fill data source 140 into fill data samples. Fill data are data to transmit in the absence of transmit data. Transmit sample buffer 128 stores the transmit data samples and fill data samples until CODEC 130 consumes the samples and converts them to an analog waveform for transmission on connection 138. Transmit sample buffer 128 is segmented into multiple blocks. On each invocation of modem process 110, transmitter process 114 fills one or more blocks of transmit sample buffer 128 with transmit data samples and, if transmit data buffer 112 is exhausted, with fill data samples. The next invocation of modem process 110 could occur on time, meaning that CODEC 130 has not started consuming the last block of samples conveyed to transmit sample buffer 128 on the prior invocation of modem process 110 ("the previous block"). Alternatively, the next invocation of modem process 110 could occur late due to competition for the host CPU, in which case CODEC 130 already began consuming the previous block. If modem process 110 invokes on time, transmitter process 114 determines whether to rewrite the previous block of transmit sample buffer 128, or whether to continue writing samples to the next block of transmit sample buffer 128. If the previous block contains fill data samples, and additional transmit data are available, then transmitter process 114 reconveys samples to the previous block and conveys samples to one additional block. Otherwise, transmitter process 114 recommences filling the next block of transmit sample buffer 128. If modem process 110 invokes late, transmitter process 114 recommences filling the next two blocks, thereby helping to prevent CODEC 130 from overrunning transmit sample buffer 128.

A modem may be implemented as modem process 110 executing in memory 156 of host computer 152, having CPU 154. Data source process 142, executing in memory 156, supplies transmit data to modem process 110. These data are the binary data of a message that data source process 142 wants to transmit, for instance, the text of an e-mail message. Transmitter process 114 converts the transmit data into digital transmit samples, and conveys the transmit samples to dedicated analog input/output (I/O) system 126. Dedicated analog I/O system 126 generates an analog waveform corresponding to the transmit samples for transmission to a remote modem (not shown), on connection 138 via line interface circuit 134.

Modem process 110 includes transmitted process 114 and receiver process 120. Data source process 142 supplies transmit data to transmit data buffer 112. Transmitter process 114 converts the transmit data from transmit data buffer 112 into transmit data samples. If (decision box 150) no transmit data are available in transmit data buffer 112, transmitter process 114 converts fill data from fill data source 140 into fill data samples. Transmitter process 114 conveys the transmit data samples and fill data samples to transmit sample buffer 128 in dedicated analog I/O system 126.

Transmitter state 116 is a collection of variables that collectively define the state of transmitter process 114, which are the variables to be restored for returning transmitter process 114 to a previous state. Returning transmitter process 114 to a previous state backs up transmitter process 114 to a previous transmit datum for rewriting the previous block of transmit sample buffer 128. Such variables may include the encoder state, the filter data delay line coefficients, modulation phase, control variables for selecting the operations of the transmitter, consumer pointer 160 indicating the address of the data in transmit data buffer 112 being supplied to transmitter process 114, and supplier pointer 162 indicating the address of transmit sample buffer 128 that transmitter process 114 is conveying samples to.

Data source process 142, modem process 110, transmit data buffer 112, fill data source 140 and transmitter process 114 may all reside in memory 156 connected to CPU 154, as shown in FIG. 1. In alternative embodiments, the various processes and buffers may reside in different memory areas. In other alternative embodiments, separate processors may control different processes or components of the system.

Dedicated analog I/O system 126 has transmit sample buffer 128, CODEC 130 and receive sample buffer 132. Dedicated analog I/O system 126 operates independently and without interruption from CPU 154. Therefore, CPU 154 does not supervise the time constraints of dedicated analog I/O system 126. Transmitter process 114 supplies transmit samples to transmit sample buffer 128. CODEC (coder/decoder) 130 converts transmit samples from transmit sample buffer 128 into an analog waveform for transmission to line interface circuit 134. CODEC 130 also converts an analog waveform received from line interface circuit 134 into receive samples and stores the receive samples in receive sample buffer 132. Receive sample buffer 132 supplies the receive samples to modem process 110.

Line interface circuit 134 couples CODEC 130 to connection 138. Connection 138 is typically the public switched telephone network. Line interface circuit 134 typically plugs into one of the buses of computer 152, and has an RJ-11 modular plug for connection to a phone line.

II. Transmitter Process

Figure 2B:
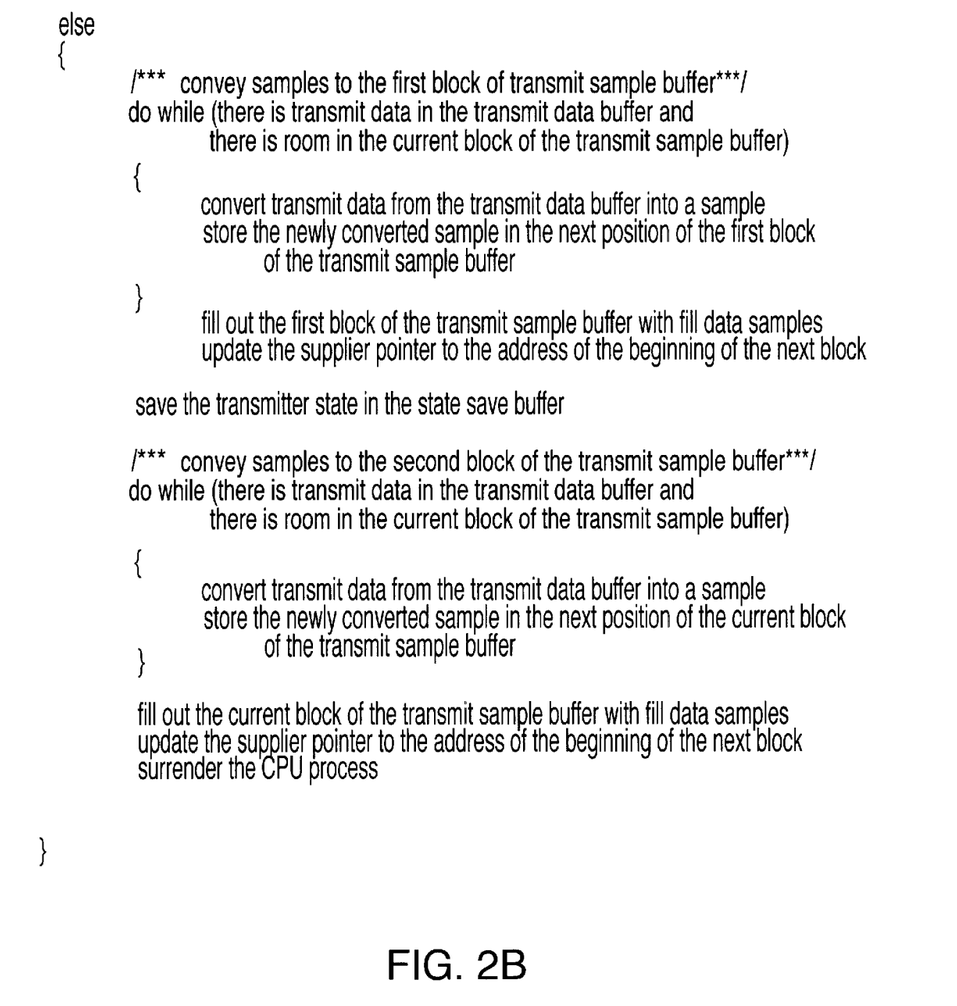

Referring to FIGS. 1, 2A and 2B, transmit sample buffer 128 is partitioned into a minimum of three blocks of roughly equal size. On each invocation of modem process 110, transmitter process 114 determines whether the invocation of modem process 110 occurred on time, before CODEC 130 began consuming the previous block. If modem process 110 invokes on time, CODEC 130 has more than one block of samples remaining in transmit sample buffer 128 to convert to an analog waveform. If modem process 110 does not invoke on time, CODEC 130 has less than one block of samples remaining in transmit sample buffer 128 to convert to an analog waveform, and CODEC 130 is consequently consuming samples from the previous block generated by transmitter process 114.

If the invocation of modem process 110 occurs on time, then transmitter process 114 may reconvey samples to the previous block of transmit sample buffer 128. Therefore, transmitter process 114 tests two predicates to determine whether to reconvey samples to the previous block, or whether to continue conveying samples to the next block. The first predicate is whether the previous block of transmit sample buffer 128 contains any fill data samples. If the previous block contains no fill data samples, there is no reason to reconvey the previous block. One method for determining whether the previous block contains any fill data samples is to include a variable in transmitter state 116 for monitoring whether transmitter process 114 conveyed any fill data samples to the previous block. The second predicate is whether transmit data buffer 112 contains additional transmit data from data source process 142, either new data added since the previous invocation of modem process 110 or data that were left unconsumed during the previous invocation of modem process 110. If transmit data buffer 112 contains no additional transmit data, there is no reason to reconvey the previous block because there are no additional transmit data for generating additional transmit data samples to replace fill data samples in the previous block.

If the two predicates are satisfied, transmitter process 114 reconveys the previous block. Transmitter process 114 conveys samples filling two blocks of transmit sample buffer 128. The first block is the previous block that transmitter process 114 filled on the prior invocation of modem process 110, and the second block is the following block, which had not been filled on the prior invocation of modem process 110.

Transmitter process 114 reconveys the previous block by essentially substituting the current state of transmitter process 114 with the state that transmitter process 114 had at the beginning of the previous block. Transmitter process 114 restores transmitter state 116 from saved transmitter state buffer 118. Transmitter process 114 flushes or backs-up the previous block of transmit sample buffer 128 to transmit data buffer 112. This can be effected by simply resetting consumer pointer 160 to the transmit data buffer 112 address location corresponding to the beginning of the previous block of transmit sample buffer 128 and resetting the state variables of the transmitter state buffer 118. After restoring the transmitter state from saved transmitter state buffer 118, transmitter process 114, transmit data buffer 112, and transmit sample buffer 128 are all in a consistent state reflecting the beginning of the previous block of transmit sample buffer 128. Consequently, no transmit data samples are lost when reconveying the previous block because transmit data samples in the previous block will be replaced or overwritten with the same transmit data samples. The samples in the previous block are modified only to the extent that fill data samples are replaced with additional transmit data samples.

Transmitter process 114 begins conveying samples to a first block of transmit sample buffer 128, i.e., reconveying the previous block. Transmitter process 114 reads transmit data from transmit data buffer 112 at the address location indicated by consumer pointer 160, and increments consumer pointer 160 to the next address location in transmit data buffer 112. Transmitter process 114 converts the transmit data into transmit data samples and stores those samples in the first block of transmit sample buffer 128, at the address location indicated by supplier pointer 162. If transmitter process 114 drains transmit data buffer 112, transmitter process 114 reads fill data from fill data source 140, converts the fill data into fill data samples and stores those samples in the first block of transmit sample buffer 128, at the address location indicated by supplier pointer 162. Transmitter process 114 increments supplier pointer 162 to the next address location in transmit sample buffer 128 after conveying each sample to transmit sample buffer 128. When transmitter process 114 reaches a block boundary of transmit sample buffer 128, transmitter process 114 saves transmitter state 116 into saved transmitter state buffer 118, thereby enabling transmitter process 114 to reconvey the upcoming block on the following invocation of modem process 110, if necessary.

Transmitter process 114 resumes generating a second block of samples in transmit sample buffer 128, following the above procedure. Transmitter process 114 converts transmit data from transmit data buffer 112 into transmit data samples, and stores the transmit data samples in the second block of transmit sample buffer 128. If transmit data buffer 112 contains insufficient transmit data to fill out the block with transmit data samples, transmitter process 114 converts fill data from fill data source 140 into fill data samples, and stores the fill data samples into the second block of transmit sample buffer 128. When the next block boundary of transmit sample buffer 128 is reached, transmitter process 114 surrenders the CPU to another process, thereby allowing dedicated analog I/O system 126 to run for a time roughly equal to the transmit time of one of the blocks of transmit sample buffer 128. Transmitter process 114 does not save transmitter state 116 into saved transmitter state buffer 118 after filling the second block.

If modem process 110 invokes on time and either of the two predicates are not satisfied, transmitter process 114 does not reconvey the previous block. Instead, transmitter process 114 continues conveying samples to the next block, filling only a single block. Prior to conveying samples to the next block, transmitter process 114 saves transmitter state into saved transmitter state buffer, thereby enabling transmitter process 114 to reconvey the upcoming block on the following invocation of modem process 110, if necessary. Transmitter process 114 generates a single block of samples in the next block of transmit sample buffer 128, following the above procedure. Transmitter process 114 converts transmit data from transmit data buffer 112 into transmit data samples, and stores the transmit data samples in the next block of transmit sample buffer 128. If transmit data buffer 112 contains insufficient transmit data to fill out the block with transmit data samples, transmitter process 114 converts fill data from fill data source 140 into fill data samples, and fills the block with fill data samples. When the following block boundary of transmit sample buffer 128 is reached, transmitter process 114 surrenders the CPU to another process, thereby allowing dedicated analog I/O system 126 to run for a time roughly equal to the transmit time of one of the blocks of transmit sample buffer 128.

If modem process 110 does not invoke on time, transmitter process 114 does not reconvey the previous block. Instead, transmitter process 114 continues conveying samples to the next block, filling two blocks. Transmitter process 114 converts transmit data from transmit data buffer 112 into transmit data samples, and stores the transmit data samples in the next block of transmit sample buffer 128. If transmit data buffer 112 contains insufficient transmit data to fill out the block with transmit data samples, transmitter process 114 converts fill data from fill data source 140 into fill data samples, and fills the block with fill data samples. Transmitter process 114 saves transmitter state 116 to saved transmitter state buffer 118 between the two blocks. There is no need to test the two predicates because transmitter process 114 cannot reconvey the previous block, considering CODEC 130 is already consuming samples from the previous block. Generation of a second block without reconveying a block helps ensure that CODEC 130 does not drain transmit sample buffer 128.

Although it may appear that the redundant computation of transmit data samples is a severe load and disadvantage, in typical applications this is a relatively small increased load on CPU 154 because receiver process 120 is the dominant consumer of CPU cycles.

Transmit sample buffer 128 may be divided into three or more blocks of equal or different sizes. Although three blocks have been described for simplicity, transmit sample buffer may be divided into a larger number of blocks having smaller size. Reducing block size trades off additional state saving for less redundant encoding of transmit data into transmit data samples and fill data into fill data samples. Thus, transmit sample buffer 128 block size should be balanced so that the load of performing redundant encoding approximately equals the load of saving transmitter state 116 into saved transmitter state buffer 118. If state-saving is a relatively lightweight operation, then transmit sample buffer 128 block size can be relatively small. As the burden of state saving increases, the relative burden of redundant encoding decreases and the transmit sample buffer block size should be increased.

The above-described technique is particularly useful when data source process 142 delivers small amounts of data to transmit data buffer 112 from data source process 142 with time separations between these data, and thus, when fill data source 140 frequently is required to supply fill data between the transmit data. In this case, transmitter process 112 frequently fills the second block of transmit sample buffer 128 with fill data samples. Therefore, re-writing the second block causes new transmit data to be taken from transmit data buffer 112, and effectively moves the new transmit data further forward in transmit sample buffer 128 than would otherwise be possible. This occurs most often when data source process 142 produces bursts of data, and where transmitter process 114 drains transmit data buffer 112 with some frequency. This process reduces latency because real transmit data samples tend to replace fill data samples, and at the same time ensures that valid samples are available to CODEC 130 should a transmit data sample starvation condition occur.

In an alternative embodiment, transmitter process 114 does not save transmitter state 116 to saved transmitter state buffer 118 until after conveying a fill data sample to the current block of transmit sample buffer 128. In this embodiment, if the previous block of transmit sample buffer 128 contains valid transmit data samples followed by fill data samples, transmitter process 114 does not re-convey the transmit data samples. Instead, transmitter process 114 resets supplier pointer 162 to the address location of the first fill data sample in the previous block, so that transmitter process 114 re-conveys only the portion of the previous block containing fill data samples.

In other alternative embodiments, transmitter process 114 rewrites the previous block whenever CODEC 130 has not started reading samples from the previous block. Alternatively, transmitter process 114 may also check whether the previous block contains any fill data samples or whether additional transmit data are available, for determining whether to rewrite the previous block, according to the principles laid out above.

In another alternative embodiment, transmitter process 114 conveys samples to transmit sample buffer 128, filling two or more blocks. Transmitter state 116 may be saved to saved transmitter state buffer 118 after each block. Transmitter process 114 may then reconvey one or more blocks of transmit sample buffer 128, replacing fill data samples with transmit data samples to the extent available.

In another alternative embodiment, transmitter process 114 initializes a block by filling the block with fill data samples, and then overwriting the fill data samples with transmit data samples to the extent available.

In another alternative embodiment, transmitter process 114 saves transmitter state 116 into saved transmitter state buffer 118 at each block boundary and when the first fill sample is stored in a block.

III. Fill Data Source

Modem implementation standards require that modem process 110 continue transmitting an analog signal representing zero or one bits, even if transmit data are unavailable in transmit data buffer 112. Fill data source 140 provides bits to transmitter process 114 when transmit data are unavailable. The bit stream for fill data source 140 depends on the transmission protocol in use by the modem. For example, if modem process 110 transmits in asynchronous mode, then fill data source 140 consists of one bit. If modem process 110 transmits in HDLC, then fill data source 140 consists of FLAG characters. Other modes of operation define other bit streams of fill data.

IV. Echo Canceller Process

Modem process 110 may include echo canceller input buffer 122 and echo canceller process 124. Transmitter process 114 and echo canceller process 124 cooperatively cancel echoes arising from the connection. Transmitter process 114 generates a set of values for echo canceller process 124 that are parallel to the actual transmit samples conveyed to dedicated analog I/O system 126, and stores such values in echo canceller input buffer 122. Echo canceller process 124 removes echoes of transmit samples that were induced in the receive samples (typically because of impedance mismatch at the near end and far end line interfaces) with summing node 136. Typical echo canceller process 124 is adapted during the handshaking process to the particular channel the modem is connected to. Receiver process 120 recovers received transmit data from the echo-free receive samples. The technique described in (application Ser. No. 09/102,028) entitled "Computer Modem", by Brooks S. Read, filed Jun. 22, 1998, incorporated herein by reference, is also useful with the segmented buffer described here.

V. Operation

Figure 3:
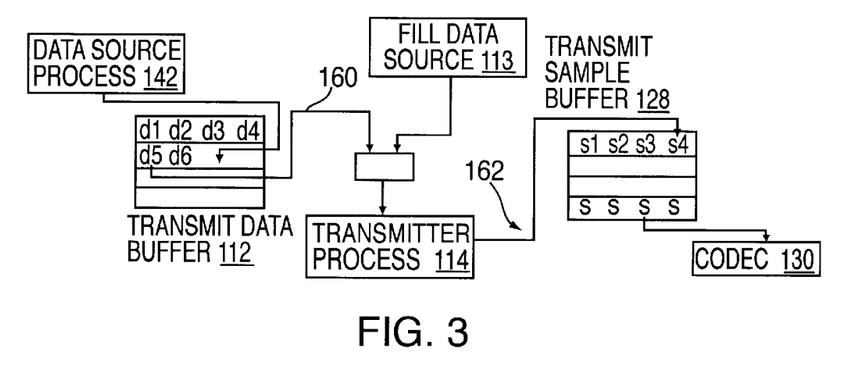
FIGS. 3–9 are block diagrams providing an example of a time sequence of steps illustrating the operation of the modem implementation of FIG. 1.

FIG. 3 shows an example of a first state snapshot of one implementation of the above-described system. Data source process 142 conveys transmit data $d_1$–$d_6$ to transmit data buffer 112. Transmitter process 114 converts transmit data $d_1$–$d_4$ into transmit data samples $s_1$–$s_4$, and conveys the transmit data samples to the current block of transmit sample buffer 128. Transmitter process 114 does not generate fill data samples because transmit data are currently available in transmit data buffer 112. Concurrently with, and independently of transmitter process 114, CODEC 130 reads transmit data samples from the previous block of transmit sample buffer 128, and generates the corresponding analog waveform for transmission on connection 138. After transmitter process 114 conveys transmit data sample $s_4$ to transmit sample buffer 128, transmitter process 114 surrenders CPU 154 to another process, for a time roughly equal to the time for CODEC 130 to read samples from one block of transmit sample buffer 128.

Figure 4:
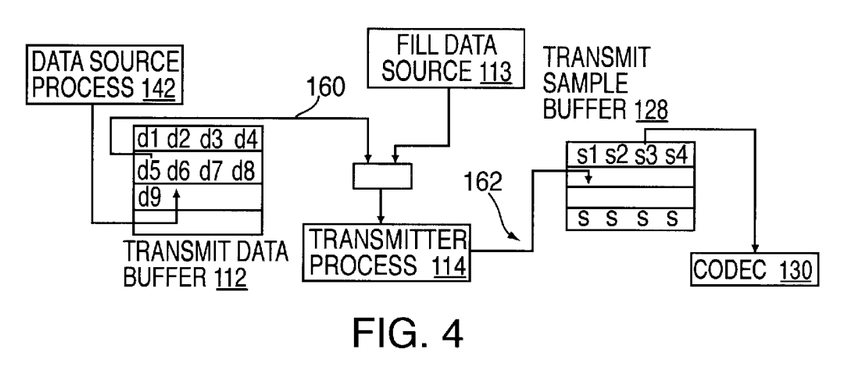

Referring to FIG. 4, consider an example of a second state snapshot during the next invocation of modem process 110, in which data source process 142 supplied additional transmit data $d_7$–$d_9$ to transmit data to transmit data buffer 112. Transmitter process 114 determines that modem process 110 invoked late, because CODEC 130 is already consuming samples from the previous block. Therefore, transmitter process 114 will continue conveying samples to the next block, filling two blocks.

Figure 5:
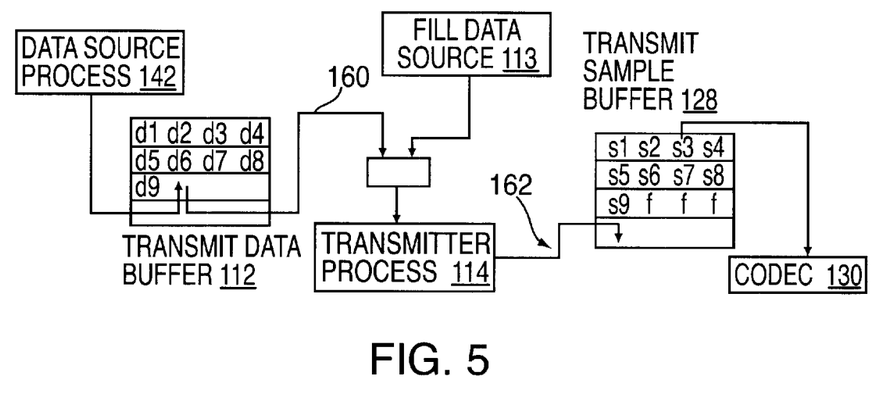

Referring to FIG. 5, consider an example of a third state snapshot subsequent to the state in FIG. 4. Transmitter process 114 converts transmit data $d_5$–$d_8$ into transmit data samples $s_5$–$s_8$ and conveys the samples to transmit sample buffer 128, filling the first block. Transmitter process 114 saves transmitter state 116 into saved transmitter state buffer 118 before continuing with the next block (a second block). Transmitter process 114 then continues converting the remaining transmit data $d_9$ into transmit data sample $s_9$ and conveys the transmit data sample to the second block of transmit sample buffer 128. Since no further transmit data are available, transmitter process 114 converts fill data from fill data source 140 into fill data samples represented by f, and conveys the fill data samples to transmit sample buffer 128, filling the second block. Transmitter process 114 surrenders CPU 154 to another process, for a time roughly equal to the time for CODEC 130 to read samples from one block of transmit sample buffer 128.

Figure 6:
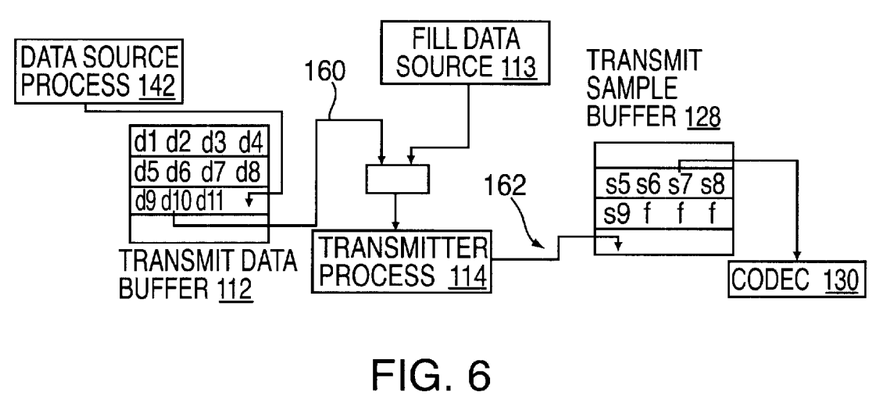

Referring to FIG. 6, consider an example of a fourth state snapshot during the next invocation of modem process 110, in which data source process 142 supplied additional transmit data $d_{10}$–$d_{11}$ to transmit data buffer 112. Transmitter process 114 determines that modem process 110 invoked on time, because CODEC 130 has not started consuming samples from the previous block. Therefore, transmitter process 114 determines to reconvey the previous block because the two predicates are satisfied—the previous block contains fill data samples and transmit data buffer 112 contains additional transmit data $d_{10}$–$d_{11}$.

Figure 7:
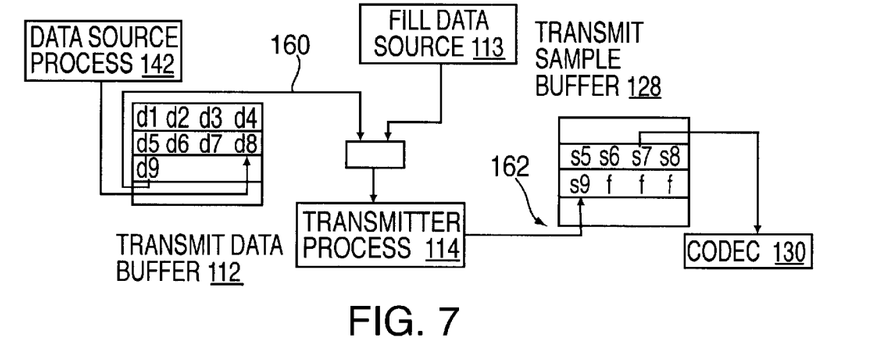

Referring to FIG. 7, consider an example of a fifth state snapshot subsequent to the state in FIG. 6, prior to reconveying the previous block. Transmitter process 114 restores transmitter state 116 from saved transmitter state buffer 118. Transmitter process 114 resets consumer pointer 160 to the address location it pointed to at the beginning of the previous block, e.g., pointing to $d_9$. Transmitter process 114 resets supplier pointer 162 to the address location of the beginning of the previous block.

Figure 8:
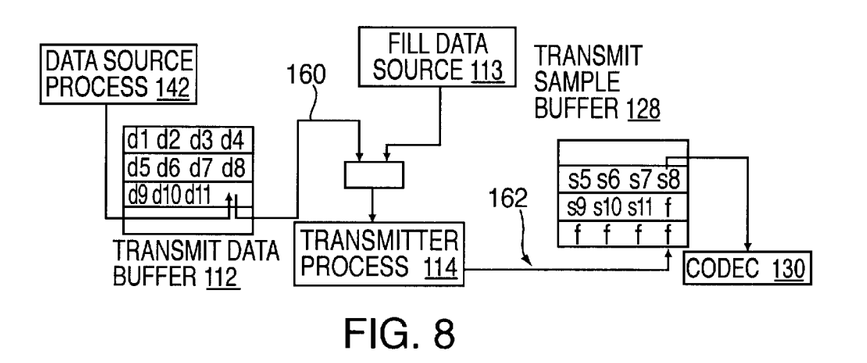

Referring to FIG. 8, consider an example of a sixth state snapshot subsequent to the state in FIG. 7. Transmitter process 114 converts transmit data $d_9$–$d_{11}$ into transmit data samples $s_9$–$s_{11}$ and conveys the samples to transmit sample buffer 128, filling the first block, and consequently, overwriting the previous block. Transmitter process 114 saves transmitter state 116 into saved transmitter state buffer 118 before continuing with the second block. Transmitter process 114 continues conveying fill data samples to the second block because no further transmit data are available. After filling the second block, transmitter process 114 surrenders CPU 154 to another process.

Figure 9:
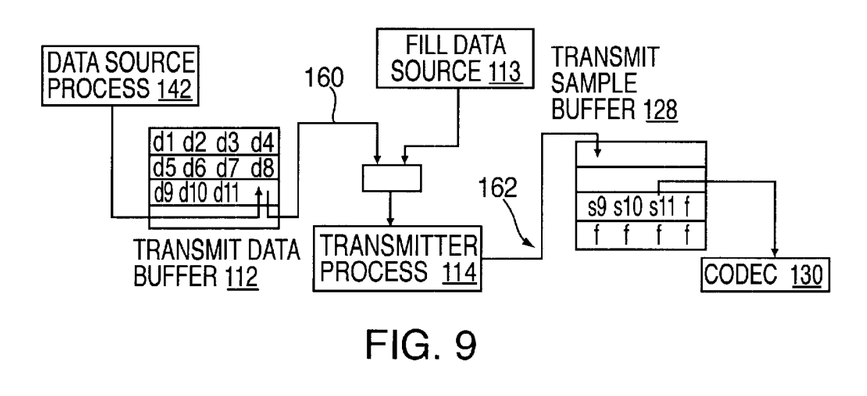

Referring to FIG. 9, consider an example of a seventh state snapshot during the next invocation of modem process 110. Transmitter process 114 determines that modem process 110 invoked on time, because CODEC 130 has not started consuming samples from the previous block. However, transmitter process 114 determines not to reconvey the previous block because the two predicates are not satisfied. Although previous block contains fill data samples, there are no additional transmit data available in transmit data buffer 112. Therefore, transmitter process 114 continues conveying samples to the next block, filling only one block.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments are within the literal scope of the following claims, and others are equivalent.

What is claimed is:

1. A method comprising:

conveying transmit data samples followed by fill data samples to a transmit buffer, the transmit data samples encoding transmit data generated for transmission to a receiver, the fill data samples having been generated to consume transmission time when transmit data are unavailable, the transmit buffer being segmented into a plurality of blocks for storing the transmit data samples and fill data samples, the number of blocks being smaller than the total sample capacity of the transmit buffer, a total number of samples conveyed to the transmit buffer being chosen to fill the transmit buffer to a boundary between the blocks;

conveying the contents of the transmit buffer to the receiver; and after filling a current block of the transmit buffer with transmit data samples and fill data samples, replacing fill data samples in the current block with transmit data samples when additional transmit data samples become available prior to conveying the fill data samples to the receiver.

2. The method of claim 1, further comprising:

replacing fill data samples in the current block prior to conveying transmit data samples or fill data samples to the next block.

3. The method of claim 1, further comprising:

saving a state of a converter that converts the transmit data to the transmit data samples as the conveying crosses a block boundary in the transmit buffer, and restoring the saved state when replacing samples.

4. The method of claim 1, further comprising:

saving a state of a converter that converts the transmit data to the transmit data samples as the first fill sample is conveyed to a block, and restoring the saved state when replacing samples in the block.

5. The method of claim 1, further comprising:

replacing all samples in the block by replacing fill data samples with new transmit data samples to the extent that new transmit data are available and, if necessary, filling any remaining portion of the block with fill data samples.

6. The method of claim 1, further comprising:

replacing only the portion of the current block containing fill data samples by replacing the fill data samples with additional transmit data samples to the extent available and, if necessary, filling any remaining portion of the block with fill data samples.

7. A method comprising:

conveying data including transmit data and fill data to a transmit buffer, the conveyed data encoding message data for transmission to a receiver, the fill data having been generated to consume transmission time when transmit data are unavailable, the transmit buffer being segmented into a plurality of blocks for storing the conveyed data, the number of blocks being much smaller than the total data capacity of the transmit buffer, a total number of data conveyed to the transmit buffer being chosen to fill the transmit buffer to a boundary between the blocks; and after filling a current block of the transmit buffer with conveyed data, determining whether to convey data again to the current block, or whether to convey data to exactly fill a next block.

8. The method of claim 7, wherein:

the conveyed data and data conveyed again include samples encoded under a modem transmit protocol, the samples encoded data including the transmit data and the fill data.

9. The method of claim 8, wherein all samples are conveyed to the transmit buffer by a process that generally maintains the transmit buffer filled to exactly a block boundary.

10. The method of claim 9, further comprising:

the determining whether to convey samples again to the current block is based at least in part on determining whether the current block contains fill data samples.

11. The method of claim 9, further comprising:

the determining whether to convey samples again to the current block is based at least in part on determining whether additional transmit data are available.

12. The method of claim 9, further comprising:

the determining whether to convey samples again to the current block is based at least in part on determining whether samples from the current block have been transmitted to the receiver.

13. The method of claim 9, further comprising:

the determining whether to convey samples again to the current block is based at least in part on determining whether additional transmit data are available.

14. The method of claim 13, further comprising:

the determining whether to convey samples again to the current block is based at least in part on determining whether samples from the current block have been transmitted to the receiver.

15. The method of claim 9, further comprising:

the determining whether to convey samples again to the current block is based at least in part on determining whether samples from the current block have been transmitted to the receiver.

16. The method of claim 15, further comprising:

the determining whether to convey samples again to the current block is based at least in part on determining whether the current block contains fill data samples.

17. The method of claim 9, wherein convey samples again to the current block comprises:

replacing fill data samples with new transmit data samples to the extent that new transmit data are available; and filling any remaining portion of the current block with fill data samples.

18. The method of claim 9, further comprising:

replacing fill data samples of the entire current block with new transmit data samples to the extent that new transmit data are available and, if necessary, filling any remaining portion of the block with fill data samples.

19. The method of claim 9, further comprising:

conveying samples again to only the portion of the block containing fill data samples, replacing the fill data samples with additional transmit data samples to the extent available and, if necessary, filling any remaining portion of the block with fill data samples.

20. The method of claim 8, further comprising:

saving a state of a converter that converts the message data to the transmit data samples as the conveying crosses a block boundary in the transmit buffer, and restoring the saved state when conveying samples again.

21. The method of claim 20, further comprising:

the determining to convey samples again to the current block is based at least in part on determining whether the current block contains fill data samples.

22. The method of claim 20, further comprising:

the determining to convey samples again to the current block is based at least in part on determining whether samples from the current block have been transmitted to the receiver.

23. The method of claim 8, further comprising:

saving a state of a converter that converts the message data to the transmit data samples as the first fill data sample is conveyed to each block, and restoring the saved state when conveying samples again to the block.

24. The method of claim 23, further comprising:

the determining whether to convey samples again to the current block is based at least in part on determining whether additional transmit data are available.

25. The method of claim 23, further comprising:

the determining whether to convey samples again to the current block is based at least in part on determining whether samples that were conveyed to the block after saving the state of the converter have been transmitted to the receiver.

26. The method of claim 8, further comprising:

determining whether to convey samples again to a prior block, the prior block having been filled with samples before filling the current block.

27. The method of claim 26, further comprising:

the determining whether to convey samples again to a prior block is based at least in part on whether additional transmit data are available.

28. The method of claim 26, further comprising:

the determining whether to convey samples again to a prior block is based at least in part on whether samples from the prior block have been transmitted to the receiver.

29. The method of claim 8, further comprising:

initializing a block with fill data samples, and overwriting the fill data samples with transmit data samples to the extent transmit data samples are available.

30. A computer storage medium with a program stored thereon, the program designed to perform the method of claim 7.

31. A method comprising:

storing transmit data followed by fill data in a transmit buffer, the transmit data encoding message data generated for transmission to a receiver, the fill data being fill data to send in the absence of message data;

conveying the contents of the transmit buffer to the receiver; and replacing fill data in the transmit buffer with transmit data when additional message data become available prior to conveying the fill data to the receiver.

32. The method of claim 31, wherein:

the transmit data and fill data include transmit data samples and fill data samples encoded under a modem transmit protocol, the transmit data samples encoding the message data.

33. The method of claim 32, further comprising:

segmenting the transmit buffer into multiple blocks for storing transmit data samples and fill data samples, the number of blocks being smaller than the total sample capacity of the transmit buffer, a process conveying samples to the transmit buffer always leaving the transmit buffer filled to a segment boundary.

34. The method of claim 33, wherein:

the transmit buffer is segmented into three or more blocks.

35. The method of claim 33, wherein:

the transmit buffer is segmented into multiple blocks of equal size.

36. The method of claim 32, further comprising:

saving a state of a converter that converts the message data to the transmit data samples when a fill data sample is conveyed to the transmit buffer, and restoring the saved stated when replacing fill data samples in the transmit buffer with transmit data samples.

37. The method of claim 32, further comprising:

conveying samples again to the portion of the transmit buffer containing fill data samples that have not been transmitted to the receiver, by replacing the fill data samples with additional transmit data samples to the extent available and, if necessary, continuing filling the transmit buffer with fill data samples.

38. The method of claim 32, further comprising:

initializing the transmit buffer with fill data samples, and overwriting the fill data samples with transmit data samples to the extent transmit data samples are available.

39. The method of claim 32, further comprising:

generating an analog waveform from samples in the transmit buffer for transmission to the receiver.

40. The method of claim 31, further comprising:

canceling echoes in received samples induced by transmitting the samples to the receiver.

41. A computer storage medium with a program stored thereon, the program designed to perform the method of claim 31.

* * * * *